US012640883B2

(12) United States Patent
He

(10) Patent No.: US 12,640,883 B2
(45) Date of Patent: May 26, 2026

(54) METHOD FOR INFORMATION INDICATION, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 318 days.

(21) Appl. No.: 18/467,830

(22) Filed: Sep. 15, 2023

(65) Prior Publication Data

US 2024/0007252 A1     Jan. 4, 2024

Related U.S. Application Data

(63) Continuation of application No. PCT/CN2021/093176, filed on May 11, 2021.

(51) Int. Cl.
 *H04L 5/00*          (2006.01)
 *H04W 48/08*          (2009.01)
(52) U.S. Cl.
 CPC ........... *H04L 5/0051* (2013.01); *H04W 48/08* (2013.01)
(58) Field of Classification Search
 None
 See application file for complete search history.

(56) References Cited

U.S. PATENT DOCUMENTS

| | | | |
|---|---|---|---|
| 2020/0014453 A1 | 1/2020 | Takeda et al. | |
| 2022/0069957 A1* | 3/2022 | Lee | H04W 72/23 |
| 2022/0131668 A1 | 4/2022 | Matsumura et al. | |
| 2022/0271878 A1* | 8/2022 | Lin | H04W 68/02 |
| 2024/0187187 A1* | 6/2024 | Jung | H04L 5/0051 |

FOREIGN PATENT DOCUMENTS

| | | |
|---|---|---|
| CN | 110690947 | 1/2020 |
| CN | 112314023 | 2/2021 |
| WO | 2020130755 | 6/2020 |
| WO | 2020166081 | 8/2020 |
| WO | 2020205652 | 10/2020 |

OTHER PUBLICATIONS

Samsung, "Moderator summary for TRS/CSI-RS occasion(s) for idle/inactive UEs," 3GPP TSG RAN WG1 #104-e, R1-2101218, Jan. 2021.

(Continued)

*Primary Examiner* — Hong S Cho
(74) *Attorney, Agent, or Firm* — Hodgson Russ LLP

(57) ABSTRACT

A method for information indication is provided. The method for information indication includes the following. A terminal device receives configuration information of a reference signal (RS) resource. The terminal device is in an idle state or an inactive state. The configuration information contains a quasi-co-location (QCL) information field. The QCL information field carries first information. The first information is used for determining QCL information of the RS resource.

20 Claims, 12 Drawing Sheets

S210

TRANSMIT, BY A NETWORK DEVICE, TO A TERMINAL DEVICE IN AN IDLE STATE OR AN INACTIVE STATE CONFIGURATION INFORMATION INDICATING AN RS RESOURCE FOR THE TERMINAL DEVICE

(56)                 References Cited

OTHER PUBLICATIONS

Sharp, "On TRS/CSI-RS occasions for idle/inactive UEs," 3GPP TSG RAN WG1 #104-e, R1-2101544, Jan. 2021.

Nordic Semiconductor ASA, "On TRS design for idle/inactive UEs," 3GPP TSG RAN WG1 #104b, R1-2103654, Apr. 2020.

WIPO, International Search Report and Written Opinion for International Application No. PCT/CN2021/093176, Feb. 10, 2022.

"3rd Generation Partnership Project; Technical Specification Group Radio Access Network; NR; Radio Resource Control (RRC) protocol specification (Release 16)," 3GPP TS 38.331, Mar. 2020, v16.0.0.

CATT, "Configuration of TRS/CSI-RS for paging enhancement," 3GPP TSG RAN WG1 #104b-e, R1-2102642, Apr. 2021.

Sharp, "On TRS/CSI-RS occasions for idle/inactive UEs," 3GPP TSG RAN WG1 #104bis-e, R1-2103479, Apr. 2021.

Lenovo et al., "Paging enhancement for UE power saving," 3GPP TSG RAN WG1 Meeting #104bis-e, R1-2103614, Apr. 2021.

EPO, Extended European Search Report for EP Application No. 21941296.2, Apr. 25, 2024.

* cited by examiner

100

TWO PATTERNS OF 12 (X=12) ANTENNA PORTS

FD-CDM2            CDM4-FD2-TD2

S210

TRANSMIT, BY A NETWORK DEVICE, TO A TERMINAL DEVICE IN AN IDLE STATE OR AN INACTIVE STATE CONFIGURATION INFORMATION INDICATING AN RS RESOURCE FOR THE TERMINAL DEVICE

S220

RECEIVE, BY THE TERMINAL DEVICE, THE CONFIGURATION INFORMATION INDICATING THE RS RESOURCE FOR THE TERMINAL DEVICE IN THE IDLE STATE OR THE INACTIVE STATE

Figure 7:
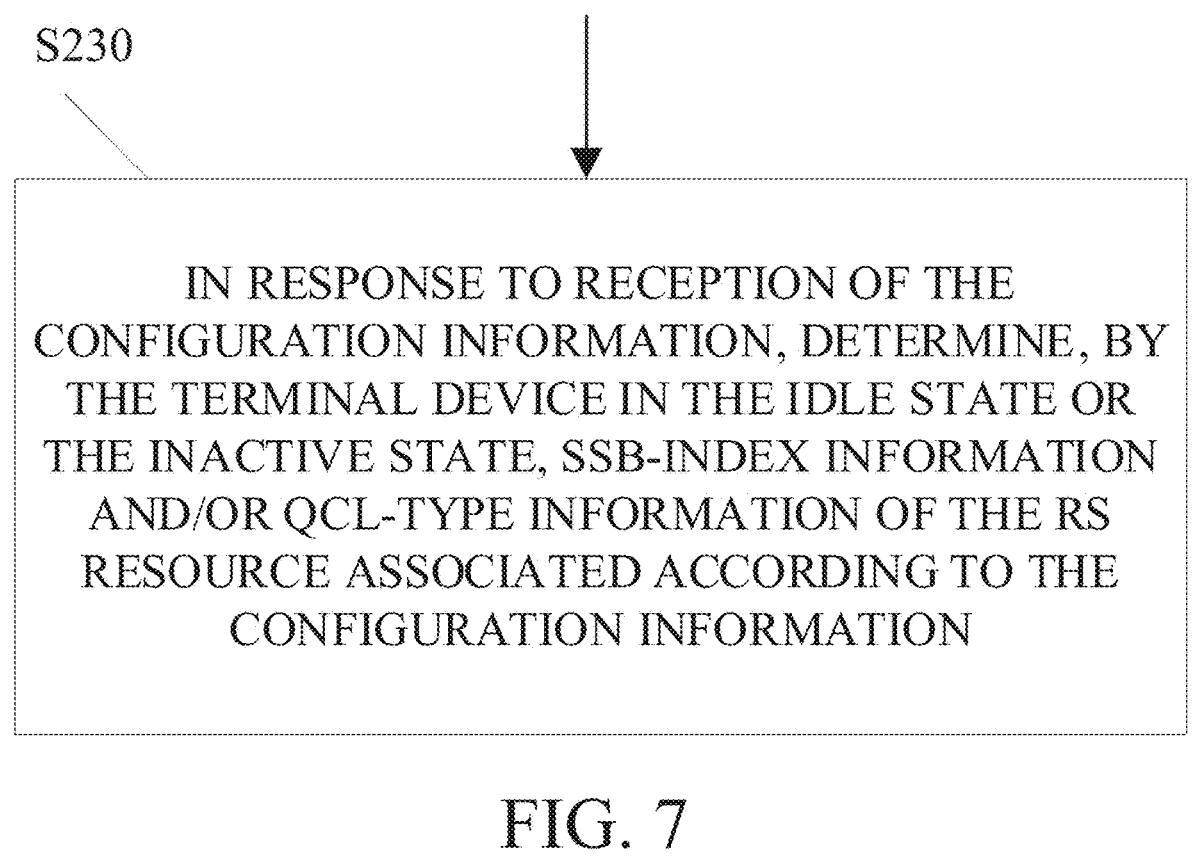

S230

IN RESPONSE TO RECEPTION OF THE
CONFIGURATION INFORMATION, DETERMINE, BY
THE TERMINAL DEVICE IN THE IDLE STATE OR
THE INACTIVE STATE, SSB-INDEX INFORMATION
AND/OR QCL-TYPE INFORMATION OF THE RS
RESOURCE ASSOCIATED ACCORDING TO THE
CONFIGURATION INFORMATION

TRANSMIT, BY A NETWORK DEVICE, CONFIGURATION INFORMATION OF AN RS RESOURCE TO A TERMINAL DEVICE

S420

TRANSMIT, BY THE NETWORK DEVICE, A SYSTEM MESSAGE TO THE TERMINAL DEVICE

S430

TRANSMIT, BY THE
NETWORK DEVICE, A
PDCCH

S440

TRANSMIT, BY THE
NETWORK DEVICE, A PEI

TERMINAL DEVICE 400

TRANSCEIVER 410

PROCESSOR 420

FIG. 17

NETWORK DEVICE 600

TRANSCEIVER 610

PROCESSOR 620

FIG. 18

METHOD FOR INFORMATION INDICATION, TERMINAL DEVICE, AND NETWORK DEVICE

CROSS-REFERENCE TO RELATED APPLICATION(S)

This application is a continuation of International Application No. PCT/CN2021/093176, filed May 11, 2021, the entire disclosure of which is incorporated herein by reference.

TECHNICAL FIELD

This disclosure relates to the field of communications, and in particular, to methods for information indication, a terminal device, and a network device.

BACKGROUND

Terminal devices in a radio resource control-connected state (RRC-connected) can perform time-frequency tracking through, for example, a configured reference signal (RS) such as a channel state information-reference signal (CSI-RS) and a tracking reference signal (TRS). For terminal devices in an idle state or inactive state, before the terminal device performs paging detection in a corresponding paging occasion (PO), the terminal device also needs to perform time-frequency tracking and automatic gain control (AGC). Since the terminal device in the idle state or the inactive state is not configured with an RS such as a CSI-RS and a TRS, introduction of the RS for the terminal device in the idle state or the inactive state is considered in the 3rd generation partnership project (3GPP) release 17 (Rel-17). However, there is no solution on how to indicate a CSI-RS/TRS resource to the terminal device in the idle state or the inactive state.

Therefore, how to indicate an RS (such as CSI-RS and TRS) resource to the terminal device in the idle state or the inactive state is a technical problem to-be-solved.

SUMMARY

Methods for information indication, a terminal device, and a network device are provided in implementations of the disclosure.

A method for information indication is provided in implementations of the disclosure. The method includes the following. A terminal device receives configuration information indicating a reference signal (RS) resource for the terminal device in an idle state or an inactive state. The configuration information contains quasi-co-location (QCL) information of the RS resource.

A method for information indication is provided in implementations of the disclosure. The method includes the following. A network device transmits to a terminal device in an idle state or an inactive state configuration information indicating an RS resource for the terminal device. The configuration information contains QCL information of the RS resource.

A terminal device is provided in implementations of the disclosure. The terminal device includes a transceiver. The transceiver is configured to receive configuration information indicating an RS resource for a terminal device in an idle state or an inactive state. The configuration information contains QCL information of the RS resource.

A network device is provided in implementations of the disclosure. The network device includes a transceiver. The transceiver is configured to transmit to a terminal device in an idle state or an inactive state configuration information indicating an RS resource for the terminal device. The configuration information contains QCL information of the RS resource.

BRIEF DESCRIPTION OF THE DRAWINGS

FIG. 7 is another schematic flow chart illustrating a method for information indication according to an implementation of the disclosure.

FIG. 17 exemplarily illustrates a schematic structural view of a terminal device according to implementations of the disclosure.

FIG. 18 exemplarily illustrates a schematic structural view of a network device according to implementations of the disclosure.

DETAILED DESCRIPTION

Figure 1:
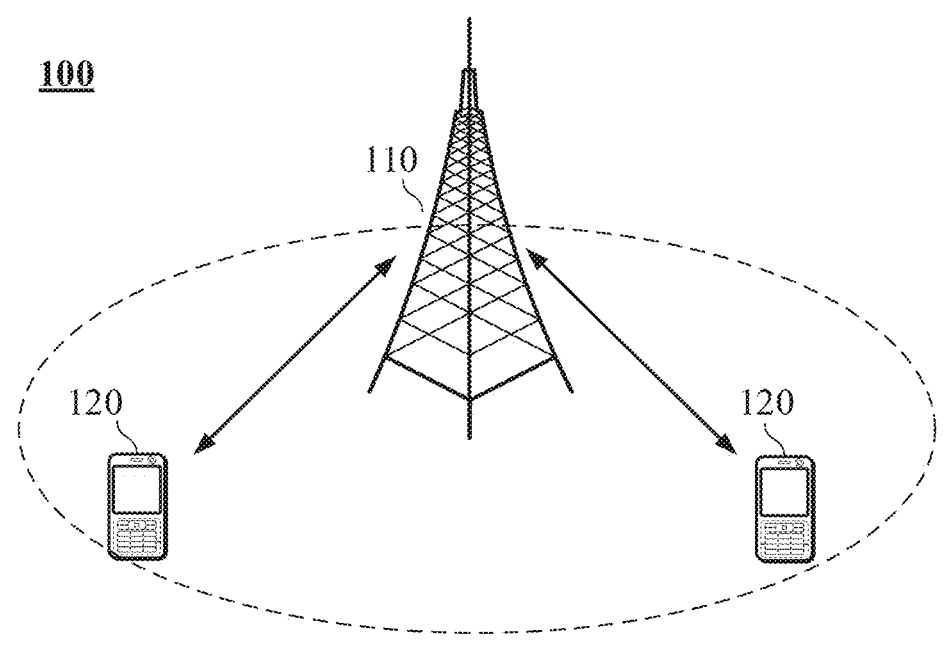
FIG. 1 is a schematic diagram illustrating an application scenario according to implementations of the disclosure.
Figure 2:
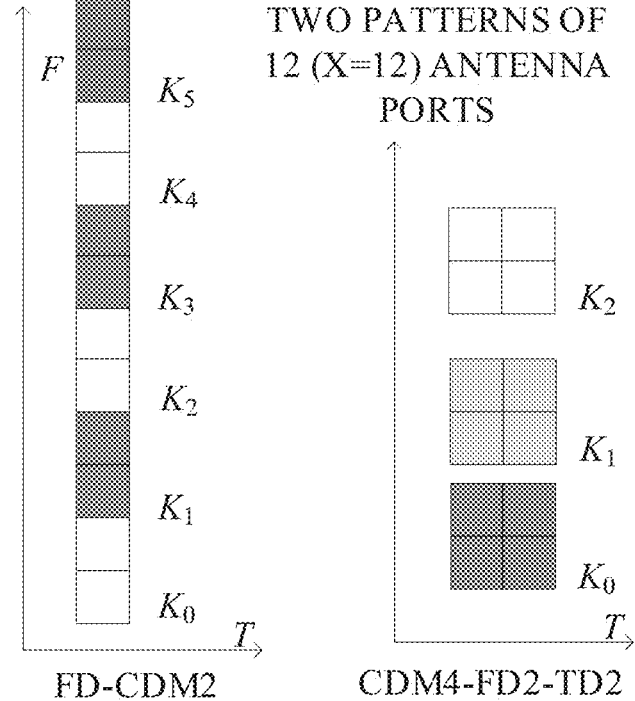
FIG. 2 exemplarily illustrates schematic diagrams of antenna port patterns.

The following will illustrate technical solutions of implementations of the disclosure with reference to accompanying drawings of implementations of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a $5^{th}$-generation (5G) system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

Optionally, a communication system in implementations of the disclosure can be applicable to a carrier aggregation (CA) scenario, a dual connectivity (DC) scenario, and a standalone (SA) scenario.

Optionally, the communication system in implementations of the disclosure can be applicable to an unlicensed spectrum, where the unlicensed spectrum can also be regarded as a shared spectrum. Alternatively, the communication system in implementations of the disclosure can also be applicable to a licensed spectrum, where the licensed spectrum can also be regarded as an unshared spectrum.

In implementations of the disclosure, each implementation is illustrated in conjunction with a network device and a terminal device, where the terminal device may also be called a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, etc.

The terminal device may also be a station (ST) in the WLAN, a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved public land mobile network (PLMN), etc.

In implementations of the disclosure, the terminal device can be deployed on land, including indoor or outdoor, handheld, wearable, or vehicle-mounted; on water (e.g., a ship); and also in the air (e.g., an aircraft, a balloon, and a satellite).

In implementations of the disclosure, the terminal device may be a mobile phone, a pad, a computer with wireless transceiving functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

In implementations of the disclosure, the network device may be a device that is used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the network device may also be a relay station, an AP, an in-vehicle device, a wearable device, a network device (a generation NodeB (gNB)) in the NR network, a network device in the future evolved PLMN, or a network device in the NTN network.

As an example but not limitation, in implementations of the disclosure, the network device can have a mobility, e.g., the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Optionally, the network device may also be a base station deployed on land, on water, or on other locations.

In implementations of the disclosure, the network device can provide a service for a cell, and the terminal device can communicate with the network device through transmission resources (e.g., frequency-domain resources or spectrum resources) for the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage ranges and low transmission power and are suitable for providing high-speed data transmission services.

FIG. 1 exemplarily illustrates a communication system 100. The communication system includes a network device 110 and two terminal devices 120. Optionally, the communication system 100 may include multiple network devices 110, and the other number of terminal devices 120 may be included in a coverage range of each of the multiple network devices 110, which will not be limited in implementations of the disclosure.

Optionally, the communication system 100 may further include a mobility management entity (MME), an access and mobility management function (AMF), or other network entities, which will not be limited in implementations of the disclosure.

The network device may further include an access network device and a core network device. That is, the wireless communication system further includes multiple core networks for communicating with the access network device. The access network device may be an LTE system, or an eNB or e-NodeB, a macro base station, a micro base station (also referred to as a "small base station"), a pico base station, an AP, a transmission point (TP), or a new-generation node B (gNodeB) in a next-generation mobile communication (NR) system or an authorized auxiliary access long-term evolution (LAA-LTE) system.

It can be understood that, a device with a communication function in a network/system in implementations of the disclosure can be called a communication device. Taking the communication system 100 illustrated in FIG. 1 as an example, communication devices may include the network device and the terminal device that have communication functions, and the network device and the terminal device may be the specific devices in implementations of the disclosure, which will not be repeated herein. The communication devices may further include other devices in the communication system, e.g., a network controller, an MME, or other network entities, which will not be limited in implementations of the disclosure.

It can be understood that, the terms "system" and "network" in this disclosure are often used interchangeably. The term "and/or" in this disclosure is simply an illustration of an association relationship of associated objects, indicating that three relationships may exist, for example, A and/or B, which may indicate the existence of A alone, A and B together, and B alone. In addition, the character "/" in this disclosure generally indicates that associated objects are in an "or" relationship.

It can be understood that, the "indication" referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term "correspondence" may represent a direct correspondence or indirect correspondence between the two, may also represent an associated relation between the two, or may further represent a relation of indicating and being indicated, a relation of configuring and being configured, or other relations.

In order to facilitate understanding of the technical solutions of implementations of the disclosure, the following describes the related technologies of implementations of the disclosure. The related technologies below may be arbitrarily combined with the technical solutions of implementations of the disclosure as an optional solution, which all belong to the scope of protection of implementations of the disclosure.

As described above, a terminal device in a radio resource control-connected (RRC-connected) state can perform time-frequency tracking through, for example, a configured reference signal (RS) such as a channel state information-reference signal (CSI-RS) and a tracking reference signal (TRS).

CSI-RS and TRS in an NR System

The CSI-RS in NR is mainly used in the following.

1. Obtain CSI. The CSI-RS is used for scheduling, link adaptation, and multiple-input multiple-output (MIMO)-related transmission settings.
2. Used for beam management. Acquisition of beam forming weights of a UE and a base station side is used to support beam management.
3. Time-frequency tracking. Time-frequency tracking may be implemented through TRS settings in the system.
4. Used for mobility management. In the system, measurement requirements related to mobility management of a terminal device are completed by acquiring and tracking a CSI-RS of an own cell and a CSI-RS of a neighbor cell.
5. Used for rate matching. Resource element (RE)-level rate matching for a data channel can be performed through zero-power (ZP) CSI-RS settings.

In the NR system, in order to flexibly support the design of virtualized mapping and codebooks for different antennas, and considering actual application deployment scenarios, the number of ports supported by NR may be 1, 2, 4, 8, 12, 16, 24, and 32, where 8, 12, 16, 24, and 32 port patterns are all composed of 2 port patterns or 4 port patterns. CSI-RSs for different antenna ports are multiplexed through frequency division, time division, or code division to construct CSI-RS patterns. Each x port CSI-RS pattern basic unit is composed of Y adjacent REs in a frequency domain and Z adjacent symbols in a time domain within a physical resource block (PRB), as illustrated below.

1 port: (Y, Z)=(1,1), 2 port: (Y, Z)=(2,1), 4 port: (Y, Z)=(4,1) or (2,2).

For example, CSI-RSs for 12 antenna ports are defined as two patterns. As illustrated in FIG. 2, pattern 1 on the left contains 6 code division multiplexing (CDM)2 groups, each CDM2 group contains 2 REs in 1 symbol, and CDM is performed on CSI-RSs for 2 antenna ports. Pattern 2 on the right contains 3 CDM4 groups, each CDM4 group contains 4 REs in 2 symbols, and CDM is performed on CSI-RSs for 4 antenna ports.

NR supports periodic, semi-persistent, and aperiodic resource configuration. CSI-RS is UE-specific configuration. Considering CSI-RS resource overhead, when a network performs CSI-RS configuration, the network device generally configures a set of CSI-RS resources for multiple UEs, where the multiple UEs can share the set of CSI-RS resources. The UE performs rate matching on an RE occupied by a CSI-RS configured. For example, if REs in resources allocated for a physical downlink shard channel (PDSCH) include an RE(s) for a CSI-RS configured by the network, the RE(s) for the CSI-RS is punctured to carry no PDSCH.

In order to achieve tracking and compensation for time offset and frequency offset of a downlink channel by the UE, the NR system defines a new RS for time-frequency tracking, which is referred to as a TRS and is also essentially a type of CSI-RS.

The NR system supports a periodic TRS and an aperiodic TRS. The periodic TRS is a CSI-RS resource set containing multiple periodic CSI-RS resources, and configuration of the resource set includes a higher-layer signaling indicating that the resource set is used as a TRS. In order to achieve a certain time tracking range, each CSI-RS resource is a 1-port CSI-RS resource with a density of 3. In order to achieve a frequency tracking range, a TRS symbol interval in a slot is 4. A TRS only supports 1 port, so all non-zero-power (NZP) CSI-RS resources configured in the CSI-RS resource set contain the same port index and correspond to the same antenna port.

For a low frequency band, a higher layer can configure a terminal device with a CSI-RS resource set containing 4 periodic CSI-RS resources. The 4 resources are distributed in 2 continuous slots, each slot contains 2 periodic CSI-RS resources, and positions of the CSI-RS resources in the 2 slots in a time domain are the same.

For a high frequency band, the higher layer can configure the terminal device with a CSI-RS resource set containing 2 periodic CSI-RS resources distributed in 1 slot, or a CSI-RS resource set containing 4 periodic CSI-RS resources distributed in 2 continuous slots, and positions of the CSI-RS resources in the 2 slots in the time domain are the same.

Many aperiodic times and some periodic times in the system cannot be aligned with the periodic TRS, which will have a serious impact on UE demodulation. In addition, after a beam in the high frequency band is changed, it cannot be accepted that time-frequency tracking according to the TRS cannot be performed for a long time. Therefore, it is necessary to introduce an aperiodic TRS on the basis of the periodic TRS. The aperiodic TRS has the same structure as the periodic TRS, such as using the same bandwidth, having the same frequency-domain position, and having the same number of slots in a TRS burst. Considering the consistency with a trigger method of an aperiodic CSI-RS, downlink control information (DCI) is used to trigger an aperiodic TRS in NR.

Power-Saving Technology of a Terminal Device

In the evolution of the NR technology, higher requirements are put forward for power saving of the terminal device. For example, for an existing DRX mechanism, during per on duration, the terminal device needs to continuously perform physical downlink control channel (PDCCH) detection to determine whether a base station has scheduled data transmission for the terminal device. However, most terminal devices may have no data transmission to-be-received during a long period of time, but still need to maintain a periodic wake-up mechanism to monitor possible downlink transmission. For the type of terminal devices, power saving can be further optimized. A case where the terminal device in the RRC idle state receives a paging message is similar to the above.

Figure 3:
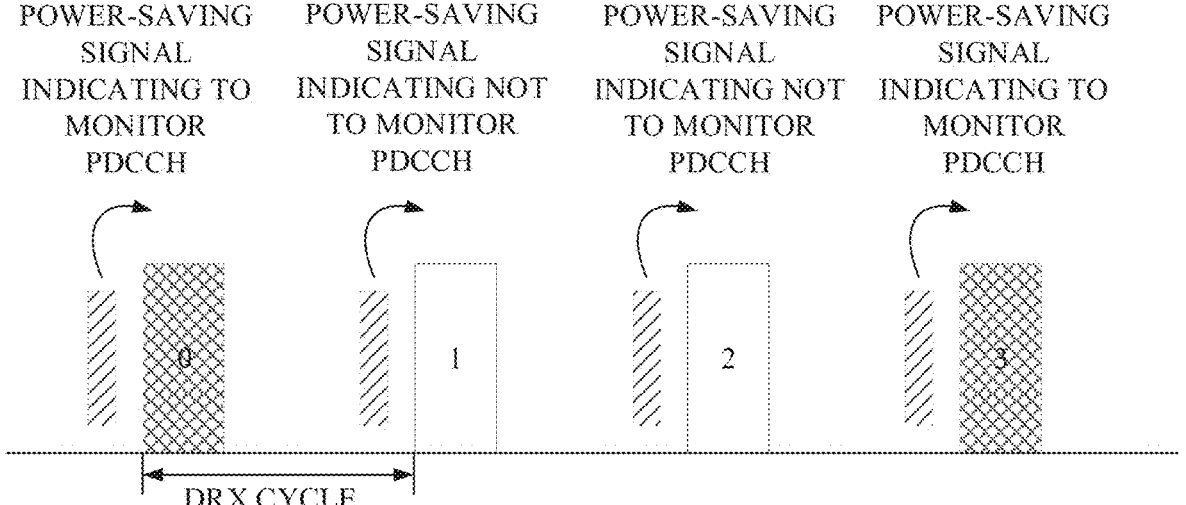
FIG. 3 exemplarily illustrates a process of indicating via a power-saving signal whether a terminal device performs physical downlink control channel (PDCCH) monitoring during discontinuous reception (DRX) on duration.

In a release 16 (Rel-16) standard, a power-saving signal is introduced to achieve further power saving. The power-saving signal is used in combination with the DRX mechanism, and the terminal device receives an indication of a power-saving wake-up signal before the DRX on duration. In the case where there is data transmission for the terminal device in a DRX cycle, the power-saving wake-up signal "wakes up" the terminal device, and the terminal device performs PDCCH monitoring during the DRX on duration. Otherwise, in the case where there is no data transmission for the terminal device in the DRX cycle, the power-saving wake-up signal does not "wake up" the terminal device, and the terminal device does not need to perform PDCCH monitoring during the DRX on duration. In the case where there is no data transmission for the terminal device, the terminal device performs no PDCCH monitoring during the DRX on duration, thereby realizing power saving. The terminal device being in a time except the DRX on duration is referred to as that the terminal device is in an inactive time, and the terminal device being in the DRX on duration is referred to as that the terminal device is in an active time. The process of indicating whether the terminal device is to perform PDCCH monitoring during the DRX on duration through the power-saving signal is illustrated in FIG. 3.

Paging

Figure 4:
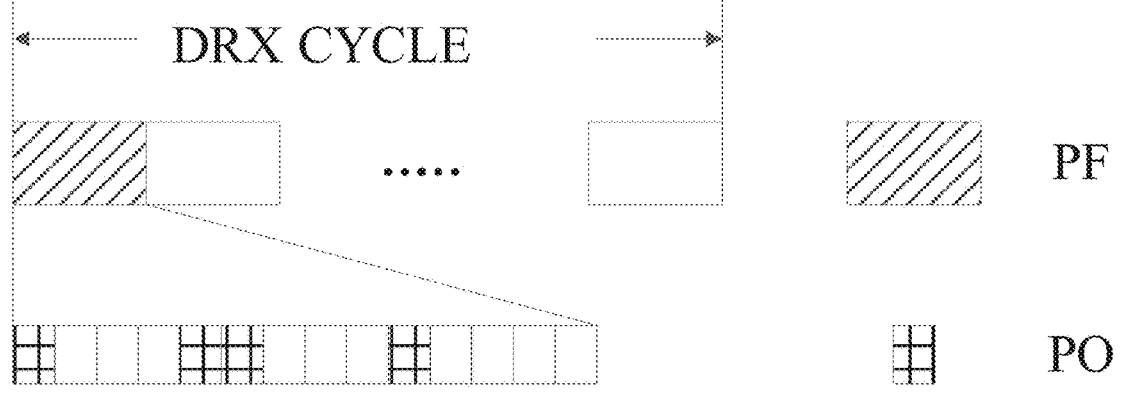
FIG. 4 exemplarily illustrates a schematic diagram of a paging frame (PF) and a paging occasion (PO).

In an NR system, the network can perform paging on a terminal device in an idle state and a terminal device in an RRC-Connected state. The paging process may be triggered by a core network or a base station, to transmit a paging request to the terminal device in the idle state, or notify the terminal device in the idle state of system information update and notify the terminal device in the idle state to receive information such as an earthquake and tsunami warning system (ETWS), a commercial mobile alert system (CMAS), etc. After the base station receives a paging message from the core network, the base station can obtain a tracking area identity (TAI) list for the terminal device by parsing the paging message, and perform air interface paging on a cell in a tracking area the identity of which belongs to the TAI list. The paging message of the core network is not decoded by the base station but is transparently transmitted to the terminal device. After the base station receives the paging message from the core network, the base station combines paging messages for terminal devices having the same paging occasion (PO) into one paging message, and transmits the paging message to relevant terminal devices through paging channels. The terminal device can receive a paging parameter via a system message, calculate a PO in conjunction with the paging parameter and an identifier (UE_ID) of the terminal device, and receive the paging message at a corresponding time. The paging message is carried in a physical downlink shared channel (PDSCH), and the terminal device can obtain paging indication information by detecting a PDCCH scrambled by a P-RNTI, and accordingly receive the paging message. Power saving of the terminal device in the idle state is achieved in the DRX manner, and the terminal device in the idle state can obtain DRX-related information from a system information block (SIB) 2. The paging message can be received by monitoring a PDCCH scrambled by a P-RNTI in a PO in a PF in the DRX cycle, as illustrated in FIG. 4.

As described above, the terminal device in the RRC-connected state can perform time-frequency tracking through, for example, a configured RS such as a CSI-RS and a TRS. For the terminal device in the idle state or the inactive state, before the terminal device performs paging detection in a corresponding PO, the terminal device also needs to perform time-frequency tracking and AGC. Since the terminal device in the idle state or the inactive state is not configured with an RS such as a CSI-RS and a TRS, introduction of the RS for the terminal device in the idle state or the inactive state is considered in the 3rd generation partnership project (3GPP) release 17 (Rel-17). However, there is no solution on how to indicate a CSI-RS/TRS resource to the terminal device in the idle state or the inactive state.

Therefore, how to indicate an RS (such as CSI-RS and TRS) resource to the terminal device in the idle state or the inactive state is a technical problem to-be-solved.

Corresponding technical solutions are provided in the disclosure.

9                                  10

Figure 5:
FIG. 5 is a schematic flow chart illustrating a method for information indication according to an implementation of the disclosure.
Figure 6:
FIG. 6 is another schematic flow chart illustrating a method for information indication according to an implementation of the disclosure.

FIG. 5 is a schematic flow chart illustrating a method for information indication according to an implementation of the disclosure. The method is optionally applicable to the terminal device and the network device in the communication system illustrated in FIG. 1, which is not limited herein. The method includes at least part of the following.

At S210, the network device transmits to the terminal device in an idle state or an inactive state configuration information indicating an RS resource for the terminal device.

The configuration information contains quasi-co-location (QCL) information of the RS resource.

At S220, the terminal device receives the configuration information indicating the RS resource for the terminal device in the idle state or the inactive state.

In the implementation, the configuration information of the RS resource may be configured through a system message.

In addition, the "RS resource" herein may include an RS (such as CSI-RS and TRS) resource, and so on.

Therefore, with the above method for information indication according to the implementation, the terminal device in the idle state or the inactive state may be configured with the configuration information of the RS (such as CSI-RS and TRS) resource.

Optionally, according to implementations of the disclosure, the QCL information may be indicated through transmission configuration indicator (TCI)-state information, and the TCI-state information may be indicated through the system message.

That is to say, unlike the related art, in implementations of the disclosure, the TCI-state information may be indicated through the system message, and the QCL information may be indicated through the TCI-state information.

The system message may indicate, for example, tci-StatesToAddModList. Specifically, the system message may be any one or more of SIB 1 to SIB 14.

The following illustrates configuration information of a CSI-RS resource according to implementations of the disclosure by using codes. The configuration information of the CSI-RS resource includes QCL information of the CSI-RS resource, that is, qcl-InfoPeriodicCSI-RS, and the QCL information may be indicated through TCI-state information.

---

NZP-CSI-RS-Resource information element

---

```
ASN1START
TAG-NZP-CSI-RS-RESOURCE-START
NZP-CSI-RS-Resource ::= SEQUENCE {
nzp-CSI-RS-ResourceId NZP-CSI-RS-ResourceId,
resourceMapping CSI-RS-ResourceMapping,
powerControlOffset INTEGER (-8..15),
powerControlOffsetSS ENUMERATED{db-3, db0, db3, db6}
OPTIONAL, -- Need R
scramblingID ScramblingId,
periodicityAndOffset CSI-ResourcePeriodicityAndOffset OPTIONAL, --
Cond
PeriodicOrSemiPersistent
qcl-InfoPeriodicCSI-RS TCI-StateId OPTIONAL, -- Cond Periodic
...
}
```

---

As illustrated in the following codes, the terminal device may be configured with one or more CSI-RS resource sets. In the case where the resource set is used for a TRS, trs-Info may be configured by default, and in this case, CSI-RS resources in the CSI-RS resource set correspond to the same antenna port, that is, QCL information of the CSI-RS resources may be the same.

```
NZP-CSI-RS-ResourceSet
The IE NZP-CSI-RS-ResourceSet is a set of Non-Zero-Power (NZP) CSI-RS resources (their
IDs) and set-specific parameters.
NZP-CSI-RS-ResourceSet information element
ASN1START
TAG-NZP-CSI-RS-RESOURCESET-START
NZP-CSI-RS-ResourceSet ::= SEQUENCE {
nzp-CSI-ResourceSetId NZP-CSI-RS-ResourceSetId,
nzp-CSI-RS-Resources SEQUENCE (SIZE (1..maxNrofNZP-CSI-RS-ResourcesPerSet)) OF
NZP-CSI-RS-ResourceId,
repetition ENUMERATED { on, off } OPTIONAL, -- Need S
aperiodicTriggeringOffset INTEGER(0..6) OPTIONAL, -- Need S
trs-Info ENUMERATED {true} OPTIONAL, -- Need R
...,
[[
aperiodicTriggeringOffset-r16 INTEGER(0..31) OPTIONAL -- Need S
]]
}
PDSCH-Config
The PDSCH-Config IE is used to configure the UE specific PDSCH parameters.
PDSCH-Config information element
ASN1START
TAG-PDSCH-CONFIG-START
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease { DMRS-DownlinkConfig }
OPTIONAL, -- Need M
dmrs-DownlinkForPDSCH-MappingTypeB SetupRelease { DMRS-DownlinkConfig }
OPTIONAL, -- Need M
tci-StatesToAddModList SEQUENCE (SIZE(1..maxNrofTCI-States)) OF TCI-State
OPTIONAL, -- Need N
tci-StatesToReleaseList SEQUENCE (SIZE(1..maxNrofTCI-States)) OF TCI-StateId
OPTIONAL, -- Need N
```

In implementations of the disclosure, as described above, in order to enable the terminal device in the idle state or the inactive state to obtain QCL information of the CSI-RS resource or QCL information of the CSI-RS resource set, TCI-state configuration information, such as tci-States-ToAddModList, may be indicated through the system message. Specifically, the system message may be any one or more of SIB 1 to SIB 14.

TCI-state configuration is as follows, where bwp-Id represents a bandwidth part (BWP) where a CSI-RS is located when the QCL information of the CSI-RS is provided. The terminal device in the idle state or the inactive state is configured with only an initial BWP and with no other CSI-RS resources. Therefore, the TCI-state information indicated in the system message may not indicate two possible RSs but only indicate a synchronization signal block (SSB)-index, that is, only the SSB-index indicates an RS(s) associated with a TCI-state.

TCI-State

The IE TCI-State associates one or two DL reference signals with a corresponding quasi-colocation (QCL) type.

```
TCI-State information element
ASN1START
TAG-TCI-STATE-START
TCI-State ::= SEQUENCE {
tci-StateId TCI-StateId,
qcl-Type1 QCL-Info,
qcl-Type2 QCL-Info OPTIONAL, -- Need R
...
}
QCL-Info ::= SEQUENCE {
cell ServCellIndex OPTIONAL, -- Need R
bwp-Id BWP-Id OPTIONAL, -- Cond CSI-RS-Indicated
referenceSignal CHOICE {
csi-rs NZP-CSI-RS-ResourceId,
ssb SSB-Index
},
qcl-Type ENUMERATED {typeA, typeB, typeC, typeD},
...
}
```

Preferably, the configured maximum number of TCI-states maxNrofTCI-States indicated in the system message is associated with the number of SSB-indexes, for example, may be equal to the number of the SSB-indexes. The number of the SSB-indexes may be related to a frequency band where a cell is located, for example, may be 4, 8, or 64. In a high frequency band, the number of SSBs may be great, for example, 128. However, in the related art, maxNrofTCI-States is 128.

maxNrofTCI-States in the system message is related to the number of the SSB-indexes.

Optionally, TCI-StateId in the TCI-state information is in a correspondence with an SSB-index.

As described above, in the related art, the terminal device in the RRC-connected state can perform time-frequency tracking through, for example, a configured RS such as a CSI-RS and a TRS. For the terminal device in the idle state or the inactive state, before the terminal device performs paging detection in a corresponding PO, the terminal device also needs to perform time-frequency tracking and AGC.

Specifically, a resource such as a TRS and a CSI-RS configured for the terminal device in the RRC-connected state can be used for the terminal device in the idle state or the inactive state, thereby reducing overhead of the resource such as a TRS and a CSI-RS. However, at present, only the terminal device in the RRC-connected state can be configured with QCL information in configuration information of a CSI-RS resource, i.e., configured with a TCI-state, and the terminal device in the idle state or the inactive state cannot obtain the TCI-state configuration information and thus cannot obtain the QCL information of the CSI-RS resource. In the related art, the TCI-state configuration information is obtained through UE-specific configuration information PDSCH-Config configured for the terminal device in the RRC-connected state, and the terminal device in the idle state or the inactive state can obtain only common configuration information and cannot obtain the UE-specific configuration information.

Since the terminal device in the idle state or the inactive state is not configured with an RS such as a CSI-RS and a TRS, the terminal device is unable to perform time-frequency tracking and the like. Furthermore, in the related art, even if such an RS is configured for the terminal device in the idle state or the inactive state, there is no solution to indicate such an RS resource to the terminal device in the idle state or the inactive state.

However, in the disclosure, the network device transmits to the terminal device in the idle state or the inactive state the configuration information indicating the RS resource for the terminal device, and the configuration information contains the QCL information of the RS resource, so that the above technical problem can be solved. In this way, the terminal device in the idle state or the inactive state can perform time-frequency tracking, AGC, and the like mentioned above.

Therefore, in the disclosure, the TRS/CSI-RS resource can be configured for the terminal device in the idle state or the inactive state through the system message, and the terminal device in the idle state or the inactive state can perform time-frequency tracking and AGC through using the TRS/CSI-RS resource. Furthermore, for configuration of the RS (such as TRS and CSI-RS) resource, the QCL information of the CSI-RS resource or the QCL information of the CSI-RS resource set may be indicated through the TCI-state information.

For a UE in a connected state, TCI-state information of the TRS/CSI-RS resource includes an RS and a QCL type associated. For the terminal device in the idle state or the inactive state, detailed QCL information in the TCI-state information may not be needed, and as provided in the above implementation, the RS associated may only be an SSB.

Furthermore, the QCL type can be predefined, for example, the QCL type can be predefined as any one or more of N (N is an integer greater than or equal to 2) types. For example, a predefined type may be any one or more of type A, type B, type C, or type D. By means of predefining the QCL type, there is no need to indicate the QCL-type in the TCI-state information.

Optionally, according to implementations of the disclosure, the QCL information may be indicated through TCI-state information predefined.

Optionally, the TCI-state information predefined indicates a QCL type predefined.

In the implementation, in the case where the TCI-state in the configuration information of the TRS/CSI-RS resource indicates QCL information predefined, it is not necessary to indicate the TCI-state configuration information in the system message. That is, the QCL information indicated through the TCI-state in the configuration information of the TRS/CSI-RS resource is predefined.

Optionally, the QCL type indicated in the TCI-state information predefined is predefined to be any one or more of N types, where N is an integer greater than or equal to 2.

Optionally, the QCL type indicated in the TCI-state information predefined may be predefined through TCI-stateId.

That is to say, the QCL type indicated in the TCI-state information predefined may be predefined through, for example, TCI-StateId.

TCI-StateId may be in a correspondence with an SSB-index, for example, TCI-StateId may be equal to the SSB-index or may be integral multiple of the SSB-index. After the terminal device in the idle state or the inactive state receives the configuration information of the TRS/CSI-RS resource, the terminal device can obtain an SSB-index and QCL-type information associated according to TCI-stateId in the configuration information and QCL information predefined by the TCI-stateId.

Optionally, in the TCI-state information and the TCI-state information predefined, the SSB-index may indicate a signal associated with the QCL information.

Optionally, maxNrofTCI-States in the system message or in the TCI-state information predefined is related to the number of the SSB-indexes.

Optionally, the TCI-state information predefined indicates at least corresponding SSB-index information predefined and/or corresponding QCL-type information predefined.

According to the implementation, the QCL information is indicated through the TCI-state information predefined, and by means of predefining the QCL type, there is no need to indicate the QCL-type in the TCI-state information.

Optionally, according to implementations of the disclosure, the QCL information may be indicated through SSB-index information.

Optionally, the QCL type may be indicated through at least one of: QCL-type information indicating a QCL type; an RS resource, where the RS resource corresponds to at least a QCL type predefined; or configuration information of the RS resource, where the configuration information of the RS resource corresponds to at least a QCL type predefined.

The QCL-type is a newly-defined field indicating a QCL type, where the QCL-type and the SSB-index information together indicate the QCL information.

In the implementation, the QCL information is indicated directly through the SSB-index information rather than the TCI-state. As illustrated in the following codes, the SSB-index information and the QCL-type information are included.

---

NZP-CSI-RS-Resource information element
ASN1START
TAG-NZP-CSI-RS-RESOURCE-START
NZP-CSI-RS-Resource ::= SEQUENCE
nzp-CSI-RS-ResourceId NZP-CSI-RS-ResourceId,
resourceMapping CSI-RS-ResourceMapping,
powerControlOffset INTEGER (–8..15),
powerControlOffsetSS ENUMERATED{db–3, db0, db3, db6}
OPTIONAL, -- Need R
scramblingID ScramblingId,
periodicityAndOffset CSI-ResourcePeriodicityAndOffset OPTIONAL, --
Cond
PeriodicOrSemiPersistent OPTIONAL, -- Cond Periodic
qcl-InfoPeriodicCSI-RS SSB-Index
qcl-Type

---

In addition, the QCL type may also be indicated through the RS resource and/or the configuration information of the RS resource besides the QCL-type information. The RS resource corresponds to at least the QCL type predefined, and the configuration information of the RS resource may correspond to at least the QCL type predefined. Therefore, the QCL type may be indicated in a predefined manner rather than specific information.

In the disclosure, the QCL information may also be indicated to the terminal device in the idle state or the inactive state in other manners besides the above manners in the foregoing implementations, which is not limited herein.

Optionally, as illustrated in FIG. 7, the method for information indication according to implementations of the disclosure may further include the following.

At S230, in response to reception of the configuration information, the terminal device in the idle state or the inactive state determines SSB-index information and/or QCL-type information of the RS resource associated according to the configuration information.

Specifically, for example, in response to reception of the configuration information, the terminal device in the idle state or the inactive state may determine the SSB-index information and/or the QCL-type information of the RS resource associated according to the TCI-state information.

For another example, in response to reception of the configuration information, the terminal device in the idle state or the inactive state may determine the SSB-index information and/or the QCL-type information of the RS resource associated according to the TCI-state information predefined.

For yet another example, in response to reception of the configuration information, the terminal device in the idle state or the inactive state may determine corresponding QCL-type information according to the QCL-type information.

For yet another example, in response to reception of the configuration information, the terminal device in the idle state or the inactive state may determine the corresponding QCL-type information according to the configuration information or an RS resource indicated in the configuration information.

Optionally, the network device can determine, for the terminal device in the idle state or the inactive state, the configuration information indicating an RS resource for the terminal device.

Optionally, the network device can configure the configuration information for the terminal device in the idle state or the inactive state according to the SSB-index information and/or the QCL-type information of the RS resource associated.

Specifically, for example, the network device can configure the TCI-state information for the terminal device in the idle state or the inactive state according to the SSB-index information and/or the QCL-type information of the RS resource associated.

For another example, the network device can configure the predefined TCI-state information for the terminal device in the idle state or the inactive state according to the SSB-index information and/or the QCL-type information of the RS resource associated.

For yet another example, the network device can configure the QCL-type information for the terminal device in the idle state or the inactive state according to the corresponding QCL-type information.

For yet another example, the network device can configure the configuration information or the RS resource indicated in the configuration information for the terminal device in the idle state or the inactive state according to the corresponding QCL-type information.

Optionally, according to implementations of the disclosure, in the case where a PDCCH carries an available RS resource or a transmission occasion for the terminal device in the idle state or the inactive state, QCL information associated with a monitoring occasion for the PDCCH may be in a correspondence with QCL information of the available RS resource indicated through the PDCCH.

Optionally, according to implementations of the disclosure, an SSB-index corresponding to the QCL information associated with the monitoring occasion for the PDCCH may be in a correspondence with an SSB-index corresponding to the QCL information of the available RS resource indicated through the PDCCH.

Optionally, according to implementations of the disclosure, the SSB-index corresponding to the QCL information associated with the monitoring occasion for the PDCCH may be the same as or have a QCL relation with the SSB-index corresponding to the QCL information of the available RS resource indicated through the PDCCH.

Optionally, according to implementations of the disclosure, QCL information of an RS resource carrying a paging early indication (PEI) may be in a correspondence with QCL information of an available RS resource indicated through the PEI.

Optionally, according to implementations of the disclosure, an SSB-index corresponding to the QCL information of the RS resource carrying the PEI may be in a correspondence with an SSB-index corresponding to the QCL information of the available RS resource indicated through the PEI.

Optionally, according to implementations of the disclosure, the SSB-index corresponding to the QCL information of the RS resource carrying the PEI may be may be the same as or have a QCL relation with the SSB-index corresponding to the QCL information of the available RS resource indicated through the PEI.

Specifically, the QCL information of the monitoring occasion for the PDCCH may be in a correspondence with the QCL information of the available TRS/CSI-RS resource indicated through the PDCCH.

Figure 8:
FIG. 8 is another schematic flow chart illustrating a method for information indication according to an implementation of the disclosure.

In order to reduce power consumption of the terminal device in the idle state or the inactive state, after the terminal device in the idle state or the inactive state is configured with the TRS/CSI-RS resource, the terminal device does not perform reception in all RS transmission occasions. The available TRS/CSI-RS resource, an available time interval of the TRS/CSI-RS resource, or a transmission occasion may be indicated through physical-layer signaling. For example, as illustrated in FIG. 8, the indication information may be carried in DCI.

The DCI may be paging DCI carrying paging indication information, and may also be a PEI indicating whether the UE is to receive a PDCCH carrying paging indication information in a target PO. Correspondingly, the monitoring occasion for the PDCCH may be a monitoring occasion for a PDCCH carrying the paging DCI, or a monitoring occasion for a PDCCH carrying the PEI.

The terminal device in the idle state or the inactive state receives the PDCCH in a common search space on an initial BWP, and QCL information of different monitoring occasions for the PDCCH is associated with SSBs, i.e., different monitoring occasions are associated with different SSB-indexes. In the case that the PDCCH carries an available TRS/CSI-RS resource or a transmission occasion that are used by the terminal device in the idle state or the inactive state, preferably, QCL of the PDCCH carrying the available TRS/CSI-RS resource or the transmission occasion is associated with QCL information of the available TRS/CSI-RS resource indicated through the PDCCH. For example, an SSB-index corresponding to the monitoring occasion for the PDCCH is the same as or has a QCL relation with an SSB-index corresponding to the QCL information of the available TRS/CSI-RS resource indicated through the PDCCH.

In addition, optionally, QCL information of an RS carrying a PEI may be in a correspondence with QCL information of an available TRS/CSI-RS resource indicated through the PEI.

In the related art, the PEI may also be carried through a sequence, for example, a secondary synchronization signal (SSS), a TRS, a CSI-RS, and the like. Different RS sequences represent different PEI.

In the case that the available TRS/CSI-RS resource is indicated through the PEI, the QCL information of the RS carrying the PEI may be in a correspondence with the QCL information of the available TRS/CSI-RS resource indicated through the PEI. For example, an SSB-index corresponding to the QCL information of the RS carrying the PEI is the same as or has a QCL relation with an SSB-index corresponding to the QCL information of the available TRS/CSI-RS resource indicated through the PEI.

Figure 9:
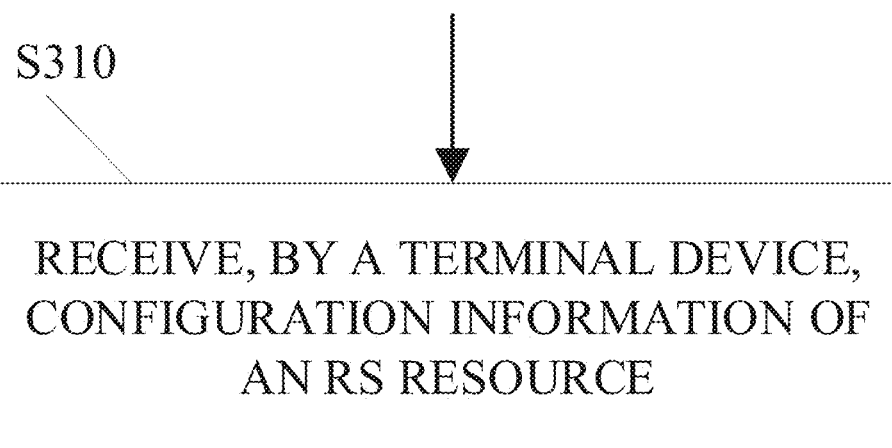
FIG. 9 is a schematic flow chart illustrating a method for information indication according to an implementation of the disclosure.

FIG. 9 illustrates another schematic flow chart illustrating a method for information indication according to an implementation of the disclosure.

As illustrated in FIG. 9, the method for information indication includes the following.

S310, a terminal device receives configuration information of an RS resource.

The terminal device is in an idle state or an inactive state, the configuration information contains a QCL information field, the QCL information domain carries first information, and the first information is used for determining QCL information of the RS resource.

The configuration information of the RS resource may be a system message or part of content in the system message.

The QCL information may include at least a QCL relation and/or a QCL type.

Optionally, the first information indicates first TCI-state information in multiple TCI-state information, where the first TCI-state information indicates the QCL information.

In other words, the QCL information may be indicated through the first TCI-state information.

Figure 10:
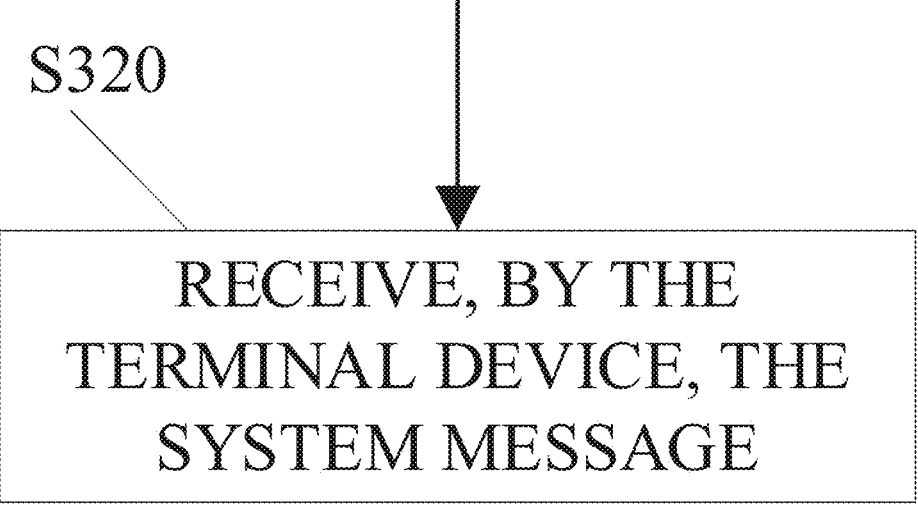
FIG. 10 is another schematic flow chart illustrating a method for information indication according to an implementation of the disclosure.

Optionally, as illustrated in FIG. 10, the method for information indication according to implementations of the disclosure may further include the following.

At S320, the terminal device receives the system message, where the system message carries the multiple TCI-state information.

In other words, unlike the related art, in implementations of the disclosure, the system message may carry the TCI-state.

The system message herein and the configuration information of the RS resource that can be used as a system message may not necessarily be the same system message.

Optionally, the multiple TCI-state information is predefined.

That is to say, according to implementations of the disclosure, the multiple TCI-state information predefined can be used.

Optionally, the first information may indicate a first SSB-index, where the first SSB-index may indicate the QCL information.

Optionally, the system message may include at least one of SIB 1 to SIB 14, which is given as an example only and is not limited herein.

Optionally, the first TCI-state information may include a second SSB-index, where the second SSB-index indicates the QCL information.

In other words, the QCL information may be indicated through the TCI-state information or the second SSB-index.

Optionally, maxNrofTCI-States in the multiple TCI-state information may be related to a value range of the first SSB-index.

Optionally, the second SSB-index may be predefined, i.e., the QCL information may be indicated through the second SSB-index predefined.

The first TCI-state information may further include QCL-type information that may be predefined.

Optionally, a QCL type of the RS resource may be predefined or configured by a network.

Optionally, the QCL type of the RS resource may be configured by at least one of: the configuration information of the RS resource or a system message.

Figure 11:
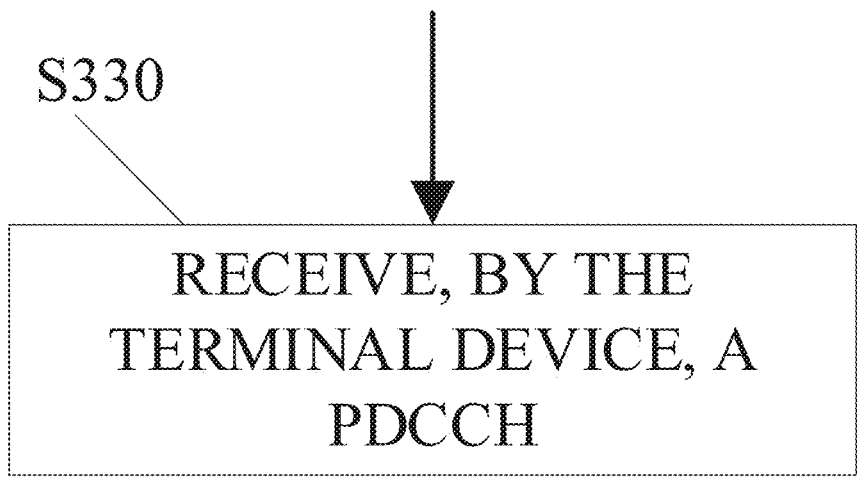
FIG. 11 is another schematic flow chart illustrating a method for information indication according to an implementation of the disclosure.

Optionally, as illustrated in FIG. 11, the method for information indication according to implementations of the disclosure may further include the following.

At S330, the terminal device receives a PDCCH.

The PDCCH indicates an available RS resource for the terminal device or a transmission occasion for the available RS resource, and QCL information of the PDCCH is in a correspondence with QCL information of the available RS resource.

Optionally, the QCL information of the PDCCH may be in the correspondence with the QCL information of the available RS resource as follows. An SSB-index corresponding to the QCL information of the PDCCH is the same as an SSB-index corresponding to the QCL information of the RS resource.

Figure 12:
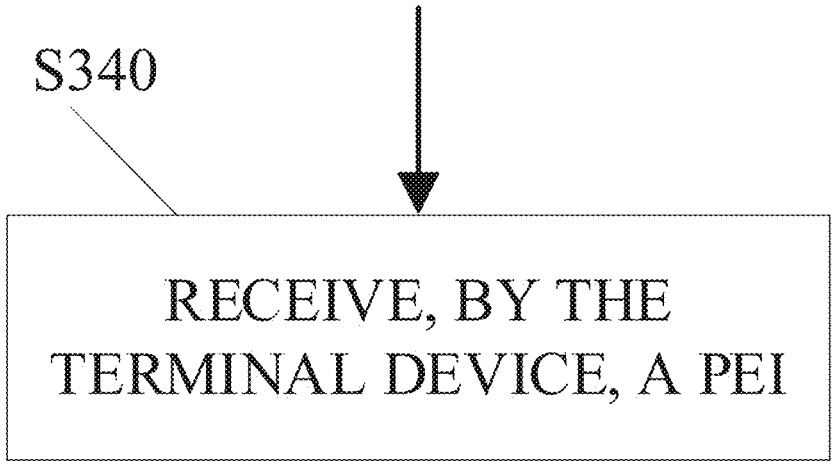
FIG. 12 is another schematic flow chart illustrating a method for information indication according to an implementation of the disclosure.

Optionally, as illustrated in FIG. 12, the method for information indication according to implementations of the disclosure may further include the following.

At S340, the terminal device receives a PEI.

The PEI indicates an available RS resource for the terminal device or a transmission occasion for the available RS resource, and QCL information of the PEI is in a correspondence with QCL information of the available RS resource.

Optionally, the QCL information of the PEI may be in the correspondence with the QCL information of the available RS resource as follows. An SSB-index corresponding to the QCL information of the PEI is the same as an SSB-index corresponding to the QCL information of the RS resource.

Figure 13:
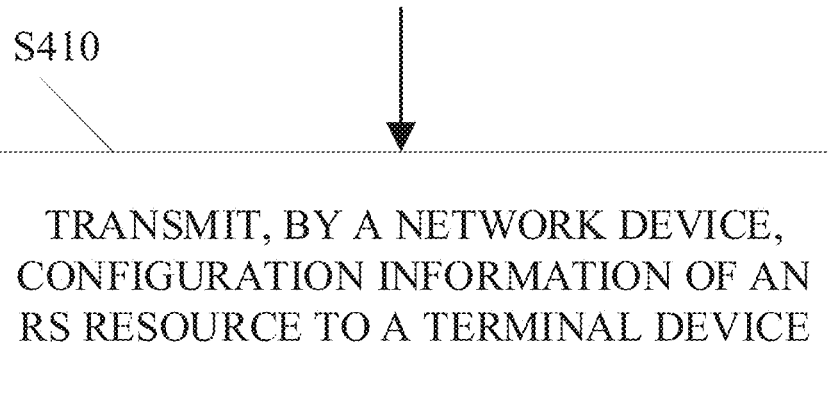
FIG. 13 is a schematic flow chart illustrating a method for information indication according to an implementation of the disclosure.

FIG. 13 illustrates another schematic flow chart illustrating a method for information indication according to an implementation of the disclosure.

As illustrated in FIG. 13, the method for information indication includes the following.

At S410, a network device transmits configuration information of an RS resource to a terminal device.

The terminal device is in an idle state or an inactive state, the configuration information contains a QCL information field, the QCL information field carries first information, and the first information is used for determining QCL information of the RS resource.

Optionally, the first information indicates first TCI-state information in multiple TCI-state information, where the first TCI-state information indicates the QCL information.

Figure 14:
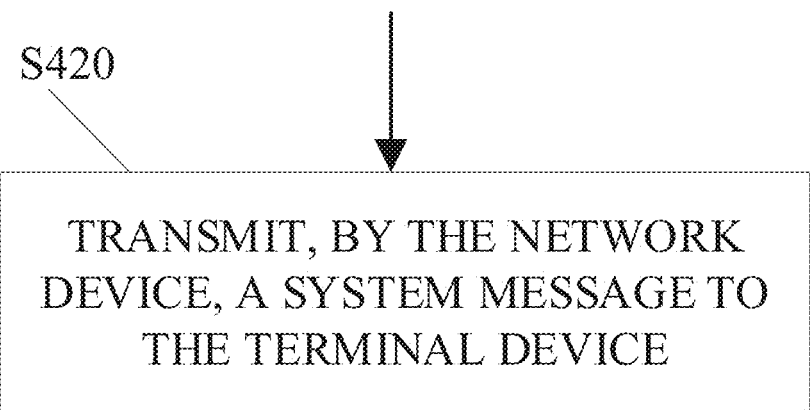
FIG. 14 is another schematic flow chart illustrating a method for information indication according to an implementation of the disclosure.

Optionally, as illustrated in FIG. 14, the method for information indication according to implementations of the disclosure may further include the following.

At S420, the network device transmits a system message to the terminal device.

The system message may carry the multiple TCI-state information.

Optionally, the multiple TCI-state information may be predefined.

Optionally, the first information may indicate a first SSB-index, where the first SSB-index may indicate the QCL information.

Optionally, the system message may include at least one of SIB 1 to SIB 14.

Optionally, the first TCI-state information may include a second SSB-index, where the second SSB-index may indicate the QCL information.

Optionally, maxNrofTCI-States in the multiple TCI-state information may be related to a value range of the first SSB-index.

Optionally, the second SSB-index is predefined.

The first TCI-state information may further include QCL-type information which may be predefined.

Optionally, a QCL type of the RS resource is predefined or configured by a network.

Optionally, the QCL type of the RS resource is configured by at least one of: the configuration information of the RS resource or a system message.

Figure 15:
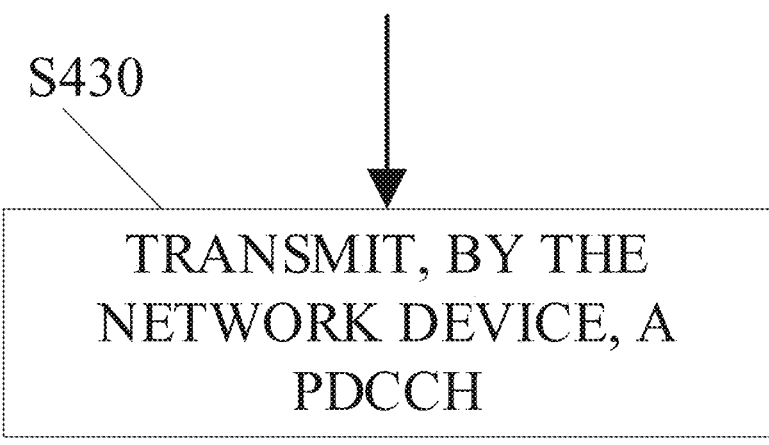
FIG. 15 is another schematic flow chart illustrating a method for information indication according to an implementation of the disclosure.

Optionally, as illustrated in FIG. 15, the method for information indication according to implementations of the disclosure may further include the following.

At S430, the network device transmits a PDCCH.

The PDCCH may indicate an available RS resource for the terminal device or a transmission occasion for the available RS resource, and QCL information of the PDCCH may be in a correspondence with QCL information of the available RS resource.

Figure 16:
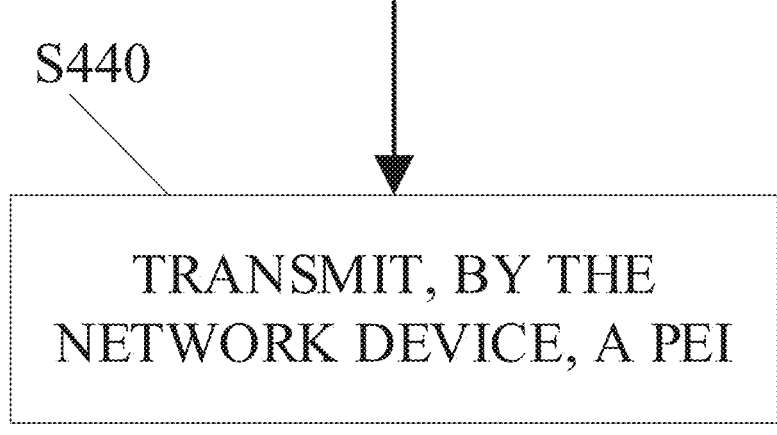
FIG. 16 is another schematic flow chart illustrating a method for information indication according to an implementation of the disclosure.

Optionally, the QCL information of the PDCCH may be in the correspondence with the QCL information of the available RS resource as follows. An SSB-index corresponding to the QCL information of the PDCCH is the same as an SSB-index corresponding to the QCL information of the RS resource Optionally, as illustrated in FIG. 16, the method for information indication according to implementations of the disclosure may further include the following.

At S440, the network device transmits a PEI.

The PE1 may indicate an available RS resource for the terminal device or a transmission occasion for the available RS resource, and QCL information of the PEI may be in a correspondence with QCL information of the available RS resource.

Optionally, the QCL information of the PEI may be in the correspondence with the QCL information of the available RS resource as follows. An SSB-index corresponding to the QCL information of the PEI is the same as an SSB-index corresponding to the QCL information of the RS resource.

Figures 17, 18:
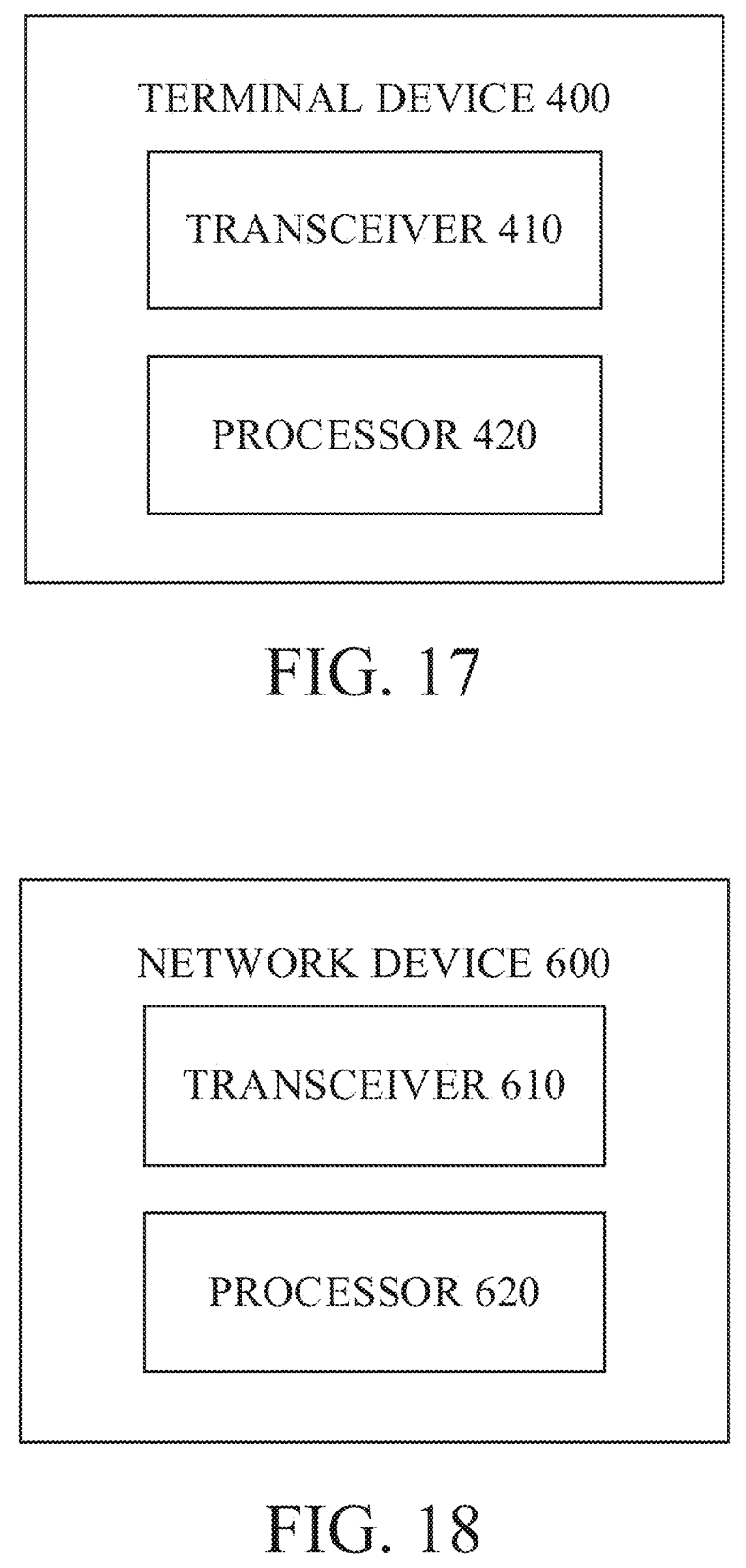

FIG. 17 illustrates a schematic block diagram of a terminal device according to implementations of the disclosure.

As illustrated in FIG. 17, a terminal device 400 according to implementations of the disclosure may include, for example, a transceiver 410 and/or a processor 420. In addition, the terminal device 400 may further include a memory. The transceiver 410 may be configured to receive configuration information indicating an RS resource for a terminal device in an idle state or an inactive state. The configuration information may contain QCL information of the RS resource.

Optionally, the processor 420 of the terminal device in the idle state or the inactive state can determine SSB-index information and/or QCL-type information of an RS resource associated according to the configuration information, in response to reception of the configuration information.

Specifically, for example, the processor 420 of the terminal device in the idle state or the inactive state can determine the SSB-index information and/or the QCL-type information of the RS resource associated according to the TCI-state information, in response to reception of the configuration information.

For another example, the processor 420 of the terminal device in the idle state or the inactive state can determine the SSB-index information and/or the QCL-type information of the RS resource associated according to the TCI-state information predefined, in response to reception of the configuration information.

For yet another example, the processor 420 of the terminal device in the idle state or the inactive state can determine corresponding QCL-type information according to the QCL-type information, in response to reception of the configuration information.

For yet another example, the processor 420 of the terminal device in the idle state or the inactive state can determine the corresponding QCL-type information according to the configuration information or an RS resource indicated in the configuration information, in response to reception of the configuration information.

Optionally, the transceiver 410 may further be configured to perform the transceiving operation performed by the terminal device in the above method for information indication, which is not limited herein.

Optionally, the processor 420 may further be configured to perform the transceiving operation, such as determining, obtaining, reading, and storing, performed by the terminal device in the above method for information indication, which is not limited herein. For the sake of simplicity, details of the operations will not be repeated.

In addition, according to another implementation of the disclosure, the transceiver 410 of the terminal device illustrated in FIG. 16 may be configured to receive configuration information of an RS resource. The terminal device is in an idle state or an inactive state. The configuration information contains a QCL information field. The QCL information field carries first information. The first information is used for determining QCL information of the RS resource.

Optionally, the first information indicates first TCI-state information in multiple TCI-state information, where the first TCI-state information indicates the QCL information.

Optionally, the transceiver 410 may further be configured to receive a system message, where the system message carries the multiple TCI-state information.

Optionally, the multiple TCI-state information is predefined.

Optionally, the first information indicates a first SSB-index, where the first SSB-index indicates the QCL information.

Optionally, the system message includes at least one of SIB 1 to SIB 14.

Optionally, the first TCI-state information includes a second SSB-index, where the second SSB-index indicates the QCL information.

Optionally, maxNrofTCI-States in the multiple TCI-state information is related to a value range of the first SSB-index.

Optionally, the second SSB-index is predefined. The first TCI-state information further includes QCL-type information predefined.

Optionally, a QCL type of the RS resource is predefined or configured by a network.

Optionally, the QCL type of the RS resource is configured by at least one of: the configuration information of the RS resource or a system message.

Optionally, the transceiver may further be configured to receive a PDCCH. The PDCCH indicates an available RS resource for the terminal device or a transmission occasion for the available RS resource, and QCL information of the PDCCH is in a correspondence with QCL information of the available RS resource.

Optionally, the QCL information of the PDCCH is in the correspondence with the QCL information of the available RS resource as follows. An SSB-index corresponding to the QCL information of the PDCCH is the same as an SSB-index corresponding to the QCL information of the RS resource.

Optionally, the transceiver may further be configured to receive a PEI. The PEI indicates an available RS resource for the terminal device or a transmission occasion for the available RS resource, and QCL information of the PEI is in a correspondence with QCL information of the available RS resource.

Optionally, the QCL information of the PEI is in the correspondence with the QCL information of the available RS resource as follows. An SSB-index corresponding to the QCL information of the PEI is the same as an SSB-index corresponding to the QCL information of the RS resource.

FIG. 18 illustrates a schematic block diagram of a network device according to implementations of the disclosure.

As illustrated in FIG. 18, a network device 600 according to implementations of the disclosure may include, for example, a transceiver 610 and/or a processor 620. In addition, the network device 600 may further include a memory. The transceiver 610 may be configured to transmit to a terminal device in an idle state or an inactive state configuration information indicating an RS resource for the terminal device. The configuration information may contain QCL information of the RS resource.

Optionally, the processor 620 may be configured to determine, for the terminal device in the idle state or the inactive state, the configuration information indicating an RS resource for the terminal device.

Optionally, the processor 620 can configure the configuration information for the terminal device in the idle state or the inactive state according to the SSB-index information and/or the QCL-type information of the RS resource associated.

Specifically, for example, the processor 620 can configure the TCI-state information for the terminal device in the idle state or the inactive state according to the SSB-index information and/or the QCL-type information of the RS resource associated.

For another example, the processor 620 can configure the predefined TCI-state information for the terminal device in the idle state or the inactive state according to the SSB-index information and/or the QCL-type information of the RS resource associated.

For yet another example, the processor 620 can configure the QCL-type information for the terminal device in the idle state or the inactive state according to the corresponding QCL-type information.

For yet another example, the processor 620 can configure the configuration information or the RS resource indicated in the configuration information for the terminal device in the idle state or the inactive state according to the corresponding QCL-type information.

Optionally, the transceiver 610 may further be configured to perform the transceiving operation performed by the network device in the above method for information indication, which is not limited herein.

Optionally, the processor 620 may further be configured to perform the transceiving operation, such as determining, obtaining, reading, and storing, performed by the network device in the above method for information indication, which is not limited herein. For the sake of simplicity, details of the operations will not be repeated.

In addition, according to another implementation of the disclosure, the transceiver 610 of the network device may be configured to transmit configuration information of an RS resource to a terminal device. The terminal device is in an idle state or an inactive state. The configuration information contains a QCL information field. The QCL information field carries first information. The first information is used for determining QCL information of the RS resource.

Optionally, the first information indicates first TCI-state information in multiple TCI-state information, where the first TCI-state information indicates the QCL information. Optionally, the transceiver 610 can transmit a system message to the terminal device, where the system message carries the multiple TCI-state information.

Optionally, the multiple TCI-state information is predefined.

Optionally, the first information indicates a first SSB-index, where the first SSB-index indicates the QCL information.

Optionally, the system message includes at least one of SIB 1 to SIB 14.

Optionally, the first TCI-state information includes a second SSB-index, where the second SSB-index indicates the QCL information.

Optionally, maxNrofTCI-States in the multiple TCI-state information is related to a value range of the first SSB-index.

Optionally, the second SSB-index is predefined. The first TCI-state information further includes QCL-type information predefined.

Optionally, a QCL type of the RS resource is predefined or configured by a network.

Optionally, the QCL type of the RS resource is configured by at least one of: the configuration information of the RS resource or a system message.

Optionally, the transceiver 610 further can transmit a PDCCH. The PDCCH indicates an available RS resource for the terminal device or a transmission occasion for the available RS resource, and QCL information of the PDCCH is in a correspondence with QCL information of the available RS resource.

Optionally, the QCL information of the PDCCH is in the correspondence with the QCL information of the available RS resource as follows. An SSB-index corresponding to the QCL information of the PDCCH is the same as an SSB-index corresponding to the QCL information of the RS resource.

Optionally, the transceiver 610 further can transmit a PEI. The PEI indicates an available RS resource for the terminal device or a transmission occasion for the available RS resource, and QCL information of the PEI is in a correspondence with QCL information of the available RS resource.

Optionally, the QCL information of the PEI is in the correspondence with the QCL information of the available RS resource as follows. An SSB-index corresponding to the QCL information of the PEI is the same as an SSB-index corresponding to the QCL information of the RS resource.

Figure 19:
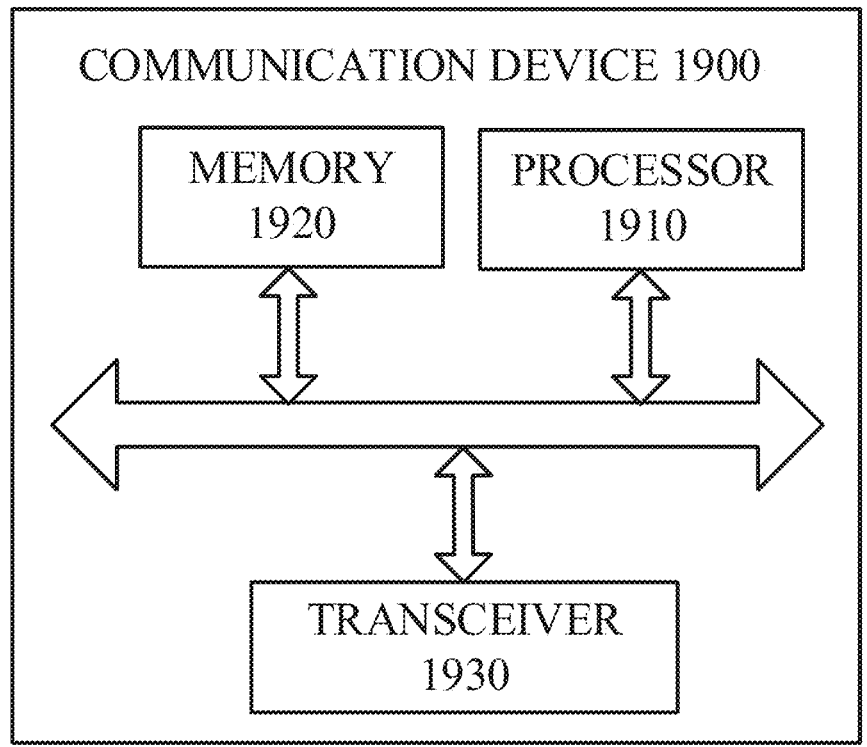
FIG. 19 exemplarily illustrates a schematic structural view of a communication device according to implementations of the disclosure.

FIG. 19 is a schematic structural view of a communication device 1900 according to implementations of the disclosure. The communication device 1900 illustrated in FIG. 19 includes a processor 1910. The processor 1910 can invoke and execute computer programs stored in a memory, to implement the methods in implementations of the disclosure.

Optionally, as illustrated in FIG. 19, the communication device 1900 may further include a memory 1920. The processor 1910 is configured to invoke and execute computer programs stored in the memory 1920, to implement the methods in implementations of the disclosure.

The memory 1920 may be a separated device independent of the processor 1910, or may be integrated into the processor 1910.

Optionally, as illustrated in FIG. 19, the communication device 1900 may further include a transceiver 1930. The processor 1910 can control the transceiver 1930 to communicate with other devices. Specifically, the transceiver 1930 can transmit information or data to other devices, or receive information or data transmitted by other devices.

The transceiver 1930 may include a transmitter and a receiver. The transceiver 1930 may further include one or more antennas.

Optionally, the communication device 1900 may be the terminal device in the implementations of the disclosure, and the communication device 1900 can implement the corresponding process implemented by the terminal device in each of the methods of the implementations of the disclosure, which will not be repeated herein for the sake of simplicity.

Optionally, the communication device 1900 may be the network device in the implementations of the disclosure, and the communication device 1900 can implement the corresponding process implemented by the network device in each of the methods of the implementations of the disclosure, which will not be repeated herein for the sake of simplicity.

Figure 20:
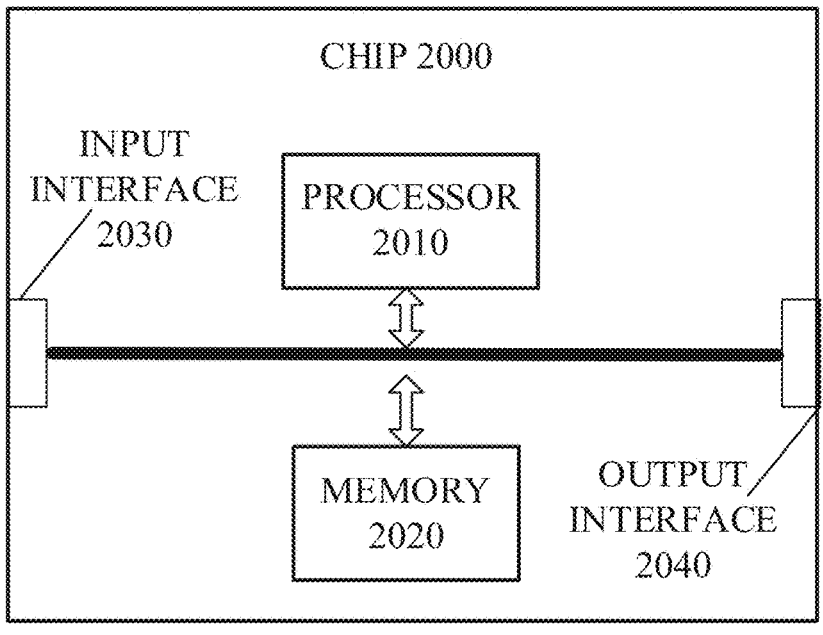
FIG. 20 exemplarily illustrates a schematic structural view of a chip according to implementations of the disclosure.

FIG. 20 is a schematic structural view of a chip 2000 according to implementations of the disclosure. The chip 2000 illustrated in FIG. 20 includes a processor 2010. The processor 2010 is configured to invoke and execute computer programs stored in a memory, to implement the methods in implementations of the disclosure.

Optionally, as illustrated in FIG. 20, the chip 2000 may further include a memory 2020. The processor 2010 is configured to invoke and execute computer programs stored in the memory 720, to implement the methods in implementations of the disclosure.

The memory 2020 may be a separated device independent of the processor 2010, or may be integrated into the processor 2010.

Optionally, the chip 2000 may further include an input interface 2030. The processor 2010 can control the input interface 2030 to communicate with other devices or chips. Specifically, the input interface 2030 can obtain information or data transmitted by other devices or chips.

Optionally, the chip 2000 may further include an output interface 2040. The processor 2010 can control the output interface 2040 to communicate with other devices or chips. Specifically, the output interface 2040 can output information or data to other devices or chips.

Optionally, the chip may be applied to the terminal device in the implementations of the disclosure, and the chip can implement the corresponding process implemented by the terminal device in each of the methods in the implementations of the disclosure, which will not be repeated herein for the sake of simplicity.

Optionally, the chip may be applied to the network device in the implementations of the disclosure, and the chip can implement the corresponding process implemented by the network device in each of the methods in the implementations of the disclosure, which will not be repeated herein for the sake of simplicity.

It can be understood that, the chip mentioned in the implementations of the disclosure may also be referred to as a system-level chip, a system chip, a chip system, a system-on-a-chip chip, or the like.

Figure 21:
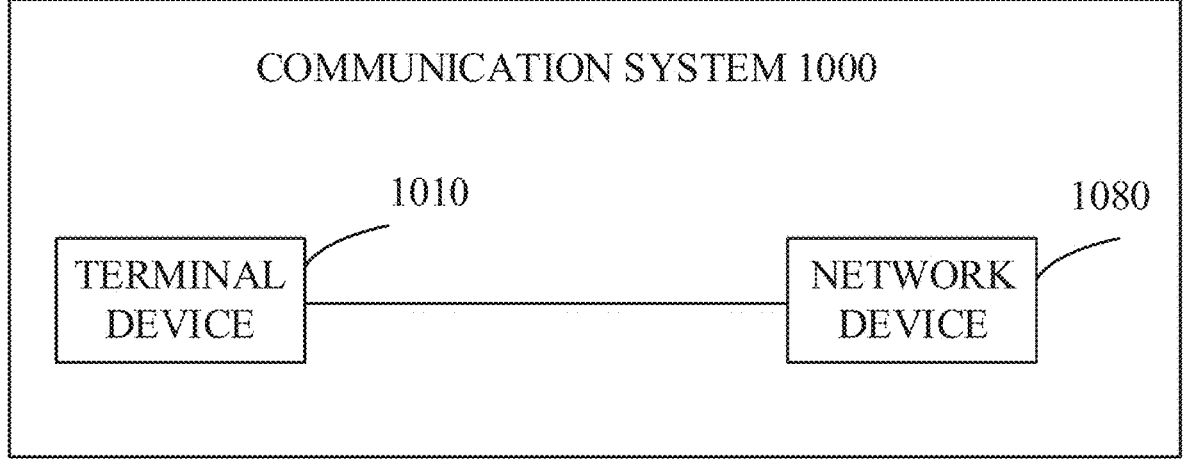
FIG. 21 exemplarily illustrates a schematic structural view of a communication system according to implementations of the disclosure.

FIG. 21 is a schematic block diagram of a communication system 1000 according to implementations of the disclosure. As illustrated in FIG. 21, the communication system 1000 includes a terminal device 1010 and a network device 1020.

The terminal device 1010 may be configured to implement the functions performed by the terminal device in the foregoing method for information indication, or may be the terminal device 400 or the communication device 1900 served as a terminal device. The network device 1020 may be configured to implement the functions performed by the network device in the foregoing method for information indication, or may be the network device 600 or the communication device 1900 served as a network device, which will not be repeated herein for the sake of simplicity.

The processor may be a general-purpose processor, a digital signal processor (DSP), a field programmable gate array (FPGA), an application specific integrated circuit (ASIC), or other programmable logic devices, transistor logic devices, discrete hardware components, etc. The general purpose processor may be a microprocessor, any conventional processor, or the like.

The memory may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM).

It is to be understood that, the above description of the memory is intended for illustration rather than limitation. For example, the memory of implementations of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DR RAM), and so on. In other words, the memory of implementations of the disclosure is intended to include, but is not limited to, these and any other suitable types of memory.

In the foregoing implementations, all or part of the illustrated functions can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should be understood that, in various implementations of the disclosure, the magnitude of a sequence number of each process mentioned above does not mean an order of execution, and the order of execution of each process should be determined by its function and an internal logic and shall not constitute any limitation to an implementation process of implementations of the disclosure. It may be evident to those skilled in the art that, for the sake of convenience and simplicity, in terms of the specific working processes of the foregoing systems, apparatuses, and units, reference can be made to the corresponding processes of the above-mentioned method implementations, which will not be repeated herein.

The above are merely specific implementations of the disclosure and are not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for information indication, comprising:
receiving, by a terminal device, configuration information of a reference signal (RS) resource, the terminal device being in an idle state or an inactive state, the configuration information containing a quasi-co-location (QCL) information field, the QCL information field carrying first information, and the first information being used for determining QCL information of the RS resource;
wherein the first information indicates a synchronization signal block (SSB)-index, wherein the SSB-index indicates the QCL information;
wherein an RS associated with the QCL information is an SSB, and the RS comprises no transmission configuration indicator (TCI)-state.

2. The method of claim 1, further comprising:
receiving, by the terminal device, a physical downlink control channel (PDCCH), wherein the PDCCH indicates an available RS resource for the terminal device or a transmission occasion for the available RS resource, and QCL information of the PDCCH is in a correspondence with QCL information of the available RS resource.

3. The method of claim 2, wherein the QCL information of the PDCCH being in the correspondence with the QCL information of the available RS resource comprises:
an SSB-index corresponding to the QCL information of the PDCCH being the same as an SSB-index corresponding to the QCL information of the RS resource.

4. The method of claim 1, further comprising:
receiving, by the terminal device, a paging early indicator (PEI), wherein the PEI indicates an available RS resource for the terminal device or a transmission occasion for the available RS resource, and QCL information of the PEI is in a correspondence with QCL information of the available RS resource.

5. The method of claim 4, wherein the QCL information of the PEI being in the correspondence with the QCL information of the available RS resource comprises:

an SSB-index corresponding to the QCL information of the PEI being the same as an SSB-index corresponding to the QCL information of the RS resource.

6. The method of claim 1, wherein a QCL type of the RS resource is predefined.

7. A method for information indication, comprising:
transmitting, by a network device, configuration information of a reference signal (RS) resource to a terminal device, the terminal device being in an idle state or an inactive state, the configuration information containing a quasi-co-location (QCL) information field, the QCL information field carrying first information, and the first information being used for determining QCL information of the RS resource;
wherein the first information indicates a synchronization signal block (SSB)-index, wherein the SSB-index indicates the QCL information;
wherein an RS associated with the QCL information is an SSB, and the RS comprises no transmission configuration indicator (TCI)-state.

8. The method of claim 7, further comprising:
transmitting, by the network device, a physical downlink control channel (PDCCH), wherein the PDCCH indicates an available RS resource for the terminal device or a transmission occasion for the available RS resource, and QCL information of the PDCCH is in a correspondence with QCL information of the available RS resource.

9. The method of claim 8, wherein the QCL information of the PDCCH being in the correspondence with the QCL information of the available RS resource comprises:
an SSB-index corresponding to the QCL information of the PDCCH being the same as an SSB-index corresponding to the QCL information of the RS resource.

10. The method of claim 7, wherein a QCL type of the RS resource is predefined.

11. The method of claim 7, further comprising:
transmitting, by the network device, a paging early indicator (PEI) to the terminal device, wherein the PEI indicates an available RS resource for the terminal device or a transmission occasion for the available RS resource, and QCL information of the PEI is in a correspondence with QCL information of the available RS resource.

12. The method of claim 11, wherein the QCL information of the PEI being in the correspondence with the QCL information of the available RS resource comprises:
an SSB-index corresponding to the QCL information of the PEI being the same as an SSB-index corresponding to the QCL information of the RS resource.

13. A terminal device, comprising:
a transceiver configured to receive configuration information of a reference signal (RS) resource, the terminal device being in an idle state or an inactive state, the configuration information containing a quasi-co-location (QCL) information field, the QCL information field carrying first information, and the first information being used for determining QCL information of the RS resource;
wherein the first information indicates a synchronization signal block (SSB)-index, wherein the SSB-index indicates the QCL information;
wherein an RS associated with the QCL information is an SSB, and the RS comprises no transmission configuration indicator (TCI)-state.

14. The terminal device of claim 13, wherein a QCL type of the RS resource is predefined.

15. The terminal device of claim 13, wherein the transceiver is further configured to receive a physical downlink control channel (PDCCH), wherein the PDCCH indicates an available RS resource for the terminal device or a transmission occasion for the available RS resource, and QCL information of the PDCCH is in a correspondence with QCL information of the available RS resource.

16. The terminal device of claim 15, wherein the QCL information of the PDCCH being in the correspondence with the QCL information of the available RS resource comprises:
an SSB-index corresponding to the QCL information of the PDCCH being the same as an SSB-index corresponding to the QCL information of the RS resource.

17. The terminal device of claim 13, wherein the transceiver is further configured to receive a paging early indicator (PEI), wherein the PEI indicates an available RS resource for the terminal device or a transmission occasion for the available RS resource, and QCL information of the PEI is in a correspondence with QCL information of the available RS resource.

18. The terminal device of claim 17, wherein the QCL information of the PEI being in the correspondence with the QCL information of the available RS resource comprises:
an SSB-index corresponding to the QCL information of the PEI being the same as an SSB-index corresponding to the QCL information of the RS resource.

19. A network device, comprising:
a transceiver configured to transmit configuration information of a reference signal (RS) resource to a terminal device, the terminal device being in an idle state or an inactive state, the configuration information containing a quasi-co-location (QCL) information field, the QCL information field carrying first information, and the first information being used for determining QCL information of the RS resource-;
wherein the first information indicates a synchronization signal block (SSB)-index, wherein the SSB-index indicates the QCL information;
wherein an RS associated with the QCL information is an SSB, and the RS comprises no transmission configuration indicator (TCI)-state.

20. The network device of claim 19, wherein a QCL type of the RS resource is predefined.

* * * * *